United States Patent Office 3,445,477
Patented May 20, 1969

3,445,477
PROCESS FOR THE PREPARATION OF
TRIMELLITIC ACID IMIDES
Gerhard Müller and Rudolf Merten, Leverkusen, Germany, assignors to Farbenfabriken Bayer Aktiengesellschaft, Leverkusen, Germany, a corporation of Germany
No Drawing. Filed Jan. 12, 1965, Ser. No. 425,082
The portion of the term of the patent subsequent to
Apr. 17, 1984, has been disclaimed
Claims priority, application Germany, Feb. 6, 1964,
F 41,928
Int. Cl. C07d 49/32, 57/00
U.S. Cl. 260—326                                8 Claims This invention comprises a process for the production of trimellitic acid imides by reacting trimellitic acid anhydride with organic mono- or polyisocyanates.

It is known to prepare bis-(trimellitic imide)-alkanes by reacting trimellitic acid anhydride and alkylene diamines at elevated temperature (see U.S. Patent 3,051,-724). It is further known that isocyanates react with carboxylic acids to form the corresponding carboxylic acid amides and with aliphatic carboxylic acid anhydrides to form carboxylic acid imides.

It has now been found that trimellitic acid imides are obtained by reacting trimellitic acid anhydride with organic mono- or polyisocyanates under anhydrous conditions, preferably in an inert solvent at temperatures between 50 and 250° C. and if desired in the presence of a catalyst. The quantities used are preferably such that one mol of trimellitic acid anhydride is available per mol of isocyanate group.

The reaction according to the invention can be represented by the following equation:

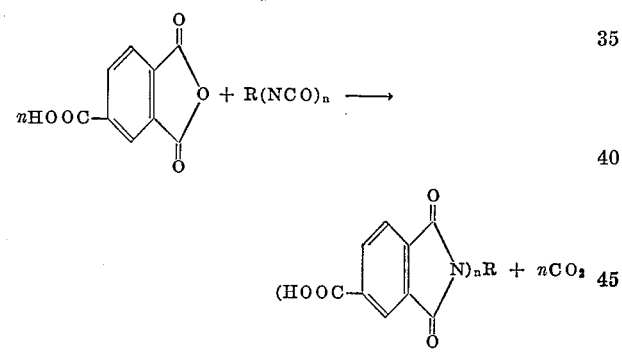

In the above formulae, R denotes an $n$-valent, alkyl-, alkenylcycloalkyl-, cycloalkenyl-, aralkyl- or aryl radical, any of which may be substituted, for example by halogen, alkoxy-, aroxy-, nitro-, cyano-, acyl-, keto-, alkylmercapto-, arylmercapto-, acylamino- or sulphonic acid radicals, and $n$ is a whole number from 1 to 3.

It has been found that phthalic acid anhydride reacts hardly at all with aromatic isocyanates and only very slowly with aliphatic isocyanates. On the other hand, it is known that free carboxylic acids react readily. It is therefore definitely surprising that in the process according to the invention, the free carboxyl group of trimellitic acid anhydride does not react with isocyanates but that only the acid anhydride function, which is in itself slow to react, undergoes definite reaction. Compared with the known processes for the preparation of bis-(trimellitic imide)-alkanes, the process according to the invention has the very important advantage that it proceeds without water being split off. The removal of water provides considerable difficulties in the known reaction. The carbondioxide evolved in the process according to the invention is chemically inert and separates itself from the reaction product.

Examples of isocyanates that can be used according to the invention are as follows: butyl isocyanate, stearyl isocyanate, cyclohexyl isocyanate, phenyl isocyanate, 1-naphthyl isocyanate, tetramethylene-(1:4)-diisocyanate, hexamethylene-(1:6)-diisocyanate and (1:4)-diisocyanate, cyclohexane-(1:4)-diisocyanate, dicyclohexylmethane-(4:4')-diisocyanate, phenylene(1:3)-diisocyanate and (1:4)-diisocyanate, toluylene-(2:6)-diisocyanate and (2:4)-diisocyanate and mixtures thereof, diphenylmethane-(4:4')-diisocyanate, diphenylether-(4:4')-diisocyanate, naphthylene-(1:5)-diisocyanate, hexahydrodiphenyl-4:4'-diisocyanate, triphenylmethane-4:4':4''-triisocyanate, p - nitrophenylisocyanate, 3:4 - dichlorophenylisocyanate, allylisocyanate, 1-methoxybenzene-2:4-diisocyanate, azobenzene-4:4'-diisocyanate, diphenyl sulphone-4:4'-diisocyanate, $\omega$:$\omega$'-dipropylether-diisocyanate, diphenylsulphide-2:4-diisocyanate, anthraquinone-2:6-diisocyanate, 1-cyanoethyl-2-isocyanate, isocyanate-ethyl acetate and the triisocyanate from 1 mol of trimethylolpropane and 3 mols of toluylene diisocyanate.

In general, the process can be carried out by bringing together isocyanate and trimellitic acid anhydride under anhydrous conditions at temperatures of 50 to 250° C., preferably 100 to 200° C. An inert solvent is preferably used. Examples of suitable solvents are hydrocarbons as high boiling gasoline fractions, toluene, xylene, tetrahydronaphthaline, decahydronaphthaline, halogenated hydrocarbons as o-dichlorobenzene, trichlorobenzene, ethers as diphenyl ether and dioxane, substituted amides as n-methylpyrrolidone, sulfoxides and sulfones as dimethylsulfoxides, tetramethylene sulphone or mixtures of these solvents.

In some cases the presence of a catalyst is also an advantage. Catalysts which have proved to be suitable are, for example, zinc chloride, tin-II-octoate, tin tetrachloride, iron(III)-chloride, p-toluene sulfonic acid and triethylenediamine.

The reaction components are used in quantities such that the trimellitic acid anhydride is present in excess or preferably in equivalent quantities calculated on an isocyanate group of the isocyanate used.

The trimellitic acid imides obtained according to the invention represent valuable intermediate products for the preparation of synthetic resins.

Example 1

23.8 parts by weight of phenyl isocyanate and 38.4 parts by weight of trimellitic acid anhydride are heated in 50 parts by weight of o-dichlorobenzene at 150° C. for 20 hours. The N-phenyltrimellitic acid imide formed is removed by suction filtration, washed with benzene and dried. The yield is 53 g. M.P. 230° C.

Example 2

42 parts by weight of hexamethylene-(1:4)-diisocyanate and 96 parts by weight of trimellitic acid anhydride are heated in 200 parts by weight of o-dichlorobenzene at 150° C. for 10 hours. The precipitated bis-(trimellitic imide)-hexane is removed by suction filtration, washed with benzene and dried at 150° C. The yield is 115 g. M.P. 309° C.

Example 3

41.5 parts by weight of cyclohexane-(1:4)-diisocyanate and 96 parts by weight of trimellitic acid anhydride are heated in 200 parts by weight of o-dichlorobenezene at 150° C. for 8 hours. The reaction product is removed by suction filtration, washed with benzene and dried at 150° C. It has the following structure

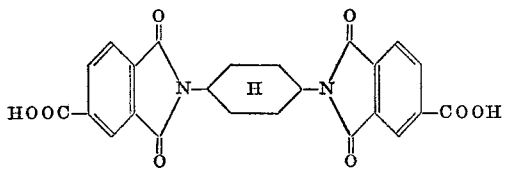

Yield 113 g. M.P. >360° C.

Example 4

40 parts by weight of phenylene-(1:4)-diisocyanate and 96 parts by weight of trimellitic acid anhydride are converted into 113 parts by weight of the diimide of the

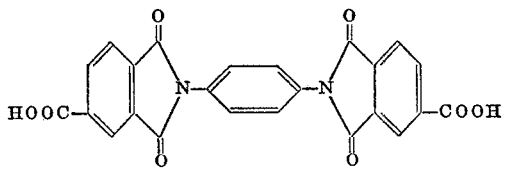

formula in a manner analogous to Examples 1 to 3. M.P. >360° C.

Example 5

In a manner analogous to Examples 1 to 3, 40 parts by weight of phenylene=(1:3)=diisocyanate and 96 parts by weight of trimellitic acid anhydride are condensed to form 113 parts by weight of the diimide of the formula

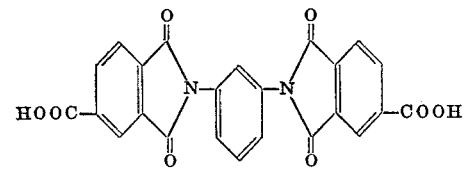

M.P. >360° C.

Example 6

43.5 parts by weight of toluylene-(2:4)-diisocyanate and 96 parts by weight of trimellitic acid anhydride are converted in the manner described in Examples 1 to 3 to 116 parts by weight of the compound of the formula

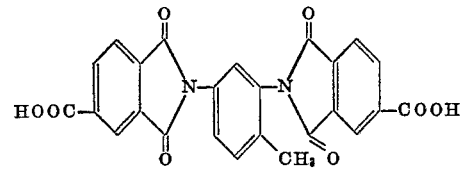

M.P. >300° C.

Example 7

In the manner described in Examples 1 to 3, 52.5 parts by weight of naphthylene-(1:5)-diisocyanate and 96 parts by weight of trimellitic acid anhydride are condensed to 126 parts by weight of the diimide of the formula M.P.

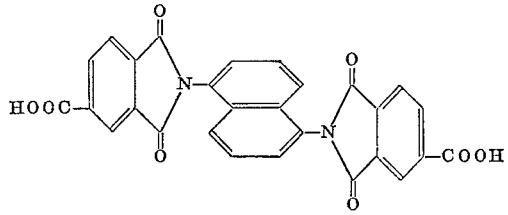

>360° C.

Example 8

25 parts by weight of diphenylmethane-4,4'-diisocyanate and 38,4 parts by weight of trimellitic acid anhydride are heated in 120 parts by weight anhydrous o-dichloro-benzene at 150° C. for 10 hours in the presence of 0,2 parts by weight anhydrous zinc chloride. $CO_2$ is split off during the reaction. From the reaction solution a yellow product precipitates. It is separated by suction filtration, washed with benzene and dried at 100° C. under reduced pressure. The reaction product of the for-

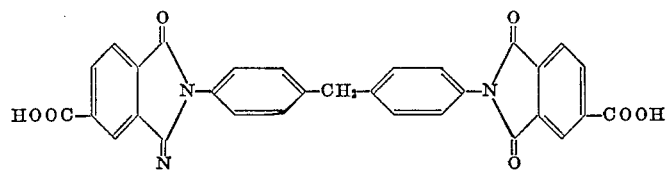

mula is obtained in quantitative field; M.P. 340 to 348° C.

The IR-spectrum shows the bands of the imide- and of the carboxylic acid groups, while the bands are missing, which would result from the amide group.

Example 9

In a manner analogous to Examples 8 25 parts by weight of diphenylmethane-4,4'-diisocyanate and 38 4 parts by weight of trimellitic acid anhydride are heated in 200 parts by weight of dioxane at 100° C. for 20 hours in the presence of 1.0 part of weight tin-II-octoate. The same reaction product as in Example 8 is obtained; M.P. 340 to 348° C.

Example 10

50 parts by weight of a triisocyanate with a NCO-content of 22.65% (prepared by trimerisation of toluylene-2,4 diisocyanate) and 52 parts by weight of trimellitic acid anhydride are heated in 300 parts by weight of o-dichlorobenzene at 150° C. for 10 hours in the presence of 0.2 part by weight of p-toluol sulfonic acid. During the reaction the yellow colored reaction product precipitates. It is isolated by suction filtration and after washing with benzene, dried at 100° C. under reduced pressure, the compound has a melting point of 345° C. and corresponds to the following formula which is confirmed by the IR-spectrum showing the characteristic bands for the imide- and carboxylic acid groups as well as the bands for the isocyanurate ring system:

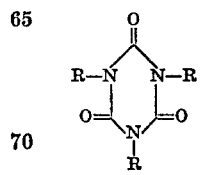 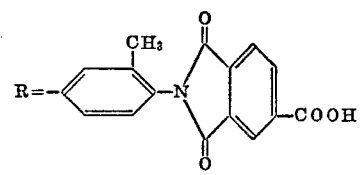

We claim:

1. A process for the production of trimellitic acid imide which comprises reacting trimellitic acid anhydride with an organic isocyanate selected from the group consisting of
butyl isocyanate,
stearyl isocyanate,
cyclohexyl iscocyanate,
phenyl isocyanate,
1-naphthyl isocyanate,
tetramethylene-(1:4)-diisocyanate,
hexamethylene-(1:6)-diisocyanate,
hexamethylene-(1:4)-diisocyanate,
cyclohexane-(1:4)-diisocyanate,
dicyclohexylmethane-(4:4′)-diisocyanate,
phenylen-(1:3)-diisocyanate,
phenylen-(1:4)-diisocyanate,
toluylene-(2:6)-diisocyanate,
toluylene-(2:4)-diisocyanate and mixtures of such toluylene diisocyanates,
diphenylmethane-(4:4′-diisocyanate,
diphenylether-(4:4′)-diisocyanate,
naphthylene-(1:5)-diisocyanate,
hexahydrodiphenyl-4:4′-diisocyanate,
triphenylmethane-4:4″-triisocyanate,
p-nitrophenylisocyanate,
3:4-dichlorophenyl-isocyanate,
allylisocyanate,
1-methoxybenzene-2:4-diisocyanate,
azobenzene-4:4′-diisocyanate,
diphenyl sulphone-4:4′-diisocyanate,
ω:ω′-dipropylether-diisocyanate,
diphenylsulphide-2:4-diisocyanate,
anthraquinone-2:6-diisocyanate,
1-cyanoethyl-2-isocyanate,
isocyanate-ethyl acetate, and the triisocyanate from 1 mol of trimethylolpropane and 3 mols of toluylene diisocyanate, in a quantity of at least one mol of said anhydride per mol of isocyanate group present under anhydrous conditions at temperatures between 50 and 250° C.

2. A process according to claim 1 wherein the reaction is carried out in the presence of a catalyst and an inert organic solvent.

3. A process according to claim 2 wherein the inert organic solvent used is selected from the group consisting of a hydrocarbon, a halogenated hydrocarbon, an ether, a substituted amide, a sulfoxide, a sulfone and mixtures thereof.

4. A process according to claim 1 wherein the reaction is carried out in o-chlorobenzene as inert organic solvent.

5. A process according to claim 1 wherein the reaction is carried out in dioxane as inert organic solvent.

6. A process according to claim 2 wherein the catalyst is anhydrous zinc chloride.

7. A process according to claim 2 wherein the catalyst is p-toluene sulfonic acid.

8. A porcess according to claim 2 wherein the catalyst is tin-II-octoate.

References Cited

Octvas et al., Tetrahedron Letters, 1966, No. 2, pp. 15–18. Call No. QD241–142.

Staiger et al., Jour. of Chem. and Engineering Data, vol. 8, July 1963, pp. 454–456. Call No. TP1–14.

ALEX MAZEL, *Primary Examiner.*

J. A. NARCAVAGE, *Assistant Examiner.*

U.S. Cl. X.R.

260—30.2; 248

PO-1050
(5/69)

UNITED STATES PATENT OFFICE
CERTIFICATE OF CORRECTION

Patent No. 3,445,477           Dated  May 20, 1969

Inventor(s) Gerhard Müller and Rudolf Merten

It is certified that error appears in the above-identified patent and that said Letters Patent are hereby corrected as shown below:

Column 4, line 34, "field" should read --yield--. Column 4, line 42, "38 4" should read --38.4--. Column 5, line 18, "-(4:4'-diisocyanate" should read -- -(4:4')-diisocyanate --. Column 5, line 22, "-4:4"-" should read -- -4:4':4"- --. Column 6, line 23, "Octvas et al." should read --Otvos et al.-- same line, "1966" should read --1960--. Column 6, line 24, "QD241-142" should read --QD241-T42--. Column 6, line 27, "TP1-14" should read --TPI-14--

SIGNED AND
SEALED
MAY 12 1970

(SEAL)
Attest:

Edward M. Fletcher, Jr.
Attesting Officer

WILLIAM E. SCHUYLER, JR.
Commissioner of Patents